March 10, 1942.   C. F. MATTKE ET AL   2,275,540
SOUND FILM PROJECTOR FOR TELEVISION SCANNING
Filed Jan. 10, 1941
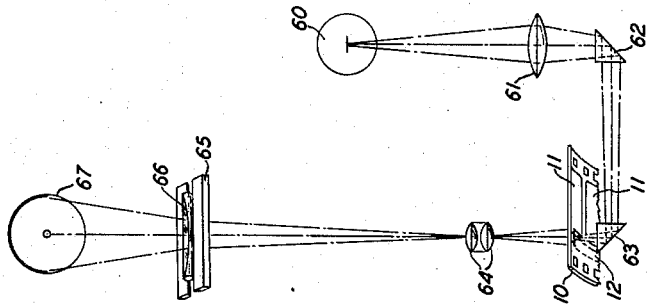
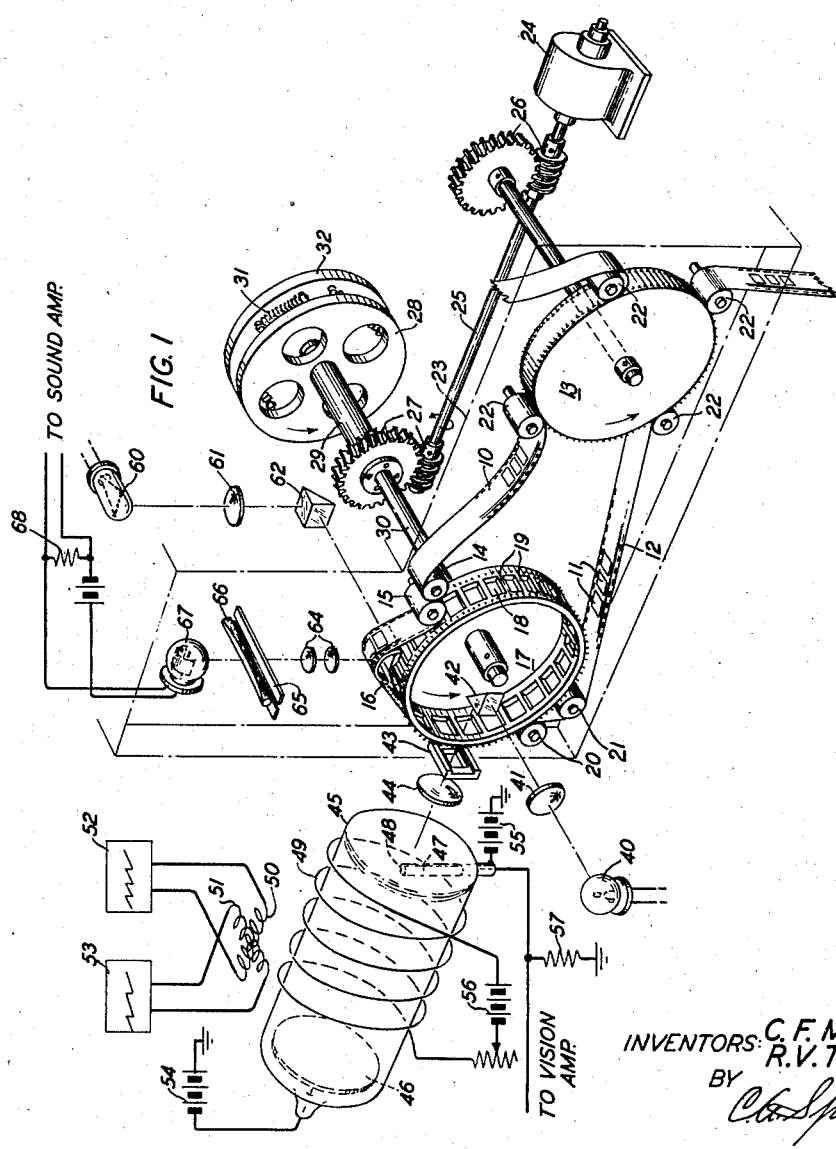
INVENTORS: C. F. MATTKE
R. V. TERRY
BY Ch. Sprague
ATTORNEY Patented Mar. 10, 1942

2,275,540

UNITED STATES PATENT OFFICE 2,275,540

SOUND FILM PROJECTOR FOR TELEVISION SCANNING

Charles F. Mattke, Jackson Heights, N. Y., and Roy V. Terry, Montclair, N. J., assignors to Bell Telephone Laboratories, Incorporated, New York, N. Y., a corporation of New York Application January 10, 1941, Serial No. 373,932

12 Claims. (Cl. 178—5.8)

This invention relates to film projector apparatus and particularly to apparatus for the simultaneous projection of moving picture film images onto a television camera and sound records borne by the same film onto a photoelectric cell, for the production of vision signals and sound signals, respectively.

An object of the invention is to economize the space required for the separation distance between the picture light gate and the sound light gate, without sacrificing any precision of adjustment of this distance.

Another object is to provide an improved arrangement for projecting images from continuously moving film onto a television pick-up device.

Another object is to provide improved means for deriving conventional television signals from the projected images of continuously moving conventional motion picture films.

Other objects are to provide apparatus of this type which shall be compact, rugged, and consistent in operation.

According to one system for translating the images and the sound track carried by a sound moving picture film into television image signals and sound signals, respectively, the film is led past the picture light gate with a continuous uniform motion in one direction while line scanning of the images successively presented is effected by movement in another direction of some scanning element such as the electron phalanx of an image dissector tube.

In addition to passing the picture light gate, the film is also led past a sound light gate, care being exercised to maintain a constant length of film between these light gates.

To ensure constant speed of a portion of the film which must travel uniformly past a light gate, it is common practice to run the film over a fly-wheel, or over a sprocket connected to a fly-wheel, in the vicinity of the light gate.

In apparatus of known construction, space must be provided to accommodate two separate light gates and also the separation distance between them. Separate space must also be provided to accommodate the fly-wheel sprocket. Provision must also be made to hold the film in a definite focal plane as it passes each of the light gates.

In pursuance of the objects of the invention, one and the same space is utilized both to accommodate the fly-wheel sprocket and to provide the necessary separation distance between the picture light gate and the sound light gate. To this end, an inertia-governed wheel-like film-guiding element, for example, a sprocket drum is provided, the film being wrapped around it throughout a substantial fraction of its circumferential arc; and a picture gate is disposed adjacent the circumference of the drum within the wrapped fraction. A sound gate is also disposed adjacent the circumference of the drum and angularly spaced apart from the picture gate, for example, by 90 degrees. Light from one source may be projected through the circumference of the sprocket drum, the film images and the picture gate onto any suitable image pick-up device, for example, a television dissector tube. Light from another source may be projected through the sound gate and the sound track of the film onto a suitable pick-up device, for example, a photoelectric cell.

It is thus a feature of the invention that the sprocket drum serves three purposes. By reason of its inertia or that of a fly-wheel mechanically coupled thereto, it maintains constancy of film speed past both the picture gate and the sound gate; its cylindrical surface holds the part of each film image which must be projected in sharp focus in a definite focal plane; and at the same time the necessary constant separation between the two gates is simply and continuously secured by an angular spacing around the periphery of the drum, without the necessity for providing additional space for the sole purpose of accommodating the light gate separation.

The invention will be more fully understood from the following detailed description of a preferred illustrative embodiment thereof taken in conjunction with the appended drawing, in which:

Fig. 1 is a diagram in perspective illustrating a preferred arrangement of apparatus in accordance with the invention and its mode of operation; and Fig. 2 is a diagram showing an arrangement of optical elements which may advantageously be included in the sound system of the invention.

Referring now to the drawing, a motion picture film 10 bearing a succession of picture images 11 and a sound track 12 is led from a magazine, not shown, over a feed sprocket 13, past guide sprockets or rollers 14 and 15, over a light shield element 16, around a substantial fraction of the circumference of a main sprocket drum 17 which the film 10 snugly embraces, past idler guide sprockets or rollers 20 and 21 and back past the opposite or take-up side of the feed sprocket 13, whence it may pass into any suitable storage magazine. Idlers 22 may be placed adjacent the periphery of the feed sprocket 13 to ensure that the sprocket teeth shall correctly engage the holes in the film. The idlers 15 and 20 serve the same purpose with respect to the main sprocket 17.

These sprockets may all advantageously be mounted within a single housing 23, the pins or axes on which the sprockets rotate being supported by an inside wall of the housing and arranged parallel to each other. Movement may be imparted to the film through rotation of both the feed sprocket 13 and the main sprocket 17, as by a constant speed motor, for example a synchronous motor 24, through a coupling shaft 25 and reduction gears 26 and 27. The feed sprocket 13 may be rigidly coupled to the motor. The main sprocket 17, however, is preferably not rigidly coupled to the motor 24. Rather, the motor is geared to a spider 28 which is mounted on a sleeve 29, free to rotate on the sprocket shaft 30, and this spider is in turn coupled through springs 31 to a fly-wheel 32 fixed to the sprocket shaft 30. The fly-wheel 32 has a large moment of inertia about its axis of rotation, whose effect may, if desired, be still further increased by massive construction of the sprocket 17 itself. This arrangement serves as a mechanical filter to eliminate high frequency components from the motion of that part of the film which is close to or in contact with the circumference of the main sprocket 17. This filtering action is further assisted by vibration-absorbing jackets in which the springs are encased. Damping is increased by friction of the film 10 on the cylindrical surface of the shield 16, maintained under light tension between the main sprocket 17 and the guide sprocket 15 by slight friction in the bearing of the sprocket 15 or the roller 14 as may be preferred.

The main sprocket 17 itself is preferably an open-ended drum having a plurality of uniformly spaced openings 18 arranged in a row on its circumference between the two circumferential rows of sprocket teeth. The teeth and the openings may be arranged with respect to each other and with respect to the film with which the apparatus is destined to be used so that when the teeth are fitted into corresponding holes on the margin of the film successive film images or frames come into registry with successive peripheral openings at the front of the drum, while the bars 19 which separate the openings 18 come into registry with the blank portions of the film which separate successive images. The drum may be mounted in overhanging fashion on its shaft 33 to permit of the placement within it of certain optical apparatus.

A suitable light source, such as an electric arc or a high power lamp 40 is arranged to project a beam of light through a lens 41 onto a right angled prism 42 which may be disposed within the overhanging portion of the sprocket drum 17 and supported in any suitable fashion, for example fixed to the housing 23 by brackets. This prism deflects the beam of the source 40 to illuminate successive images of the film 10, exposed in the openings 18, as they successively occupy the forward portion of the drum 17 within the arc of wrap. The film images thus illuminated may then be translated into vision signals in accordance with any desired plan, for example, they may be imaged through an aperture or gate 43, which may be a suitably placed hole in the wall of the housing 23, and a lens 44 onto a photoelectric cathode of a television camera such as an image dissector, from the target of which vision currents may then be drawn.

The gate 43 is preferably placed as shown in Fig. 1 on a line joining the center of rotation of the sprocket drum 17 to the approximate center of the arc throughout which the film 10 wraps it. The film 10 is maintained precisely in correct alignment by its snug engagement with the circumference of the drum throughout this arc. Its arcuate form gives it stiffness against bending transversely of its length. Thus as the sprocket drum 17 rotates successive film images are projected on the photoelectric cathode of the dissector and traverse it from side to side. Since, however, each film image lies in a curved surface, all parts of the optical image thereof formed on the photoelectric cathode may not be in sharp focus, but a narrow band of each film image, extending transversely of the film and lying at the intersection of the film with a horizontal diameter of the sprocket drum 17, may be brought into sharp focus on the photoelectric cathode by the lens 44. As the sprocket drum 17 rotates, this film band travels from bottom to top of each film image in succession so that images of the band, as it occupies successive positions on the film, occupy substantially the same position on the photocathode.

The dissector, which operates in accordance with the principles set forth in Farnsworth Patent 1,773,980, comprises an evacuated envelope 45, a photoelectric cathode 46, a target 47 disposed behind an aperture in an anode 48, a focussing coil 49 and horizontal and vertical deflecting elements such as coils 50 and 51. The electrodes and coils are connected to suitable potential sources, for example, to batteries 54, 55 and 56 and suitable sources of deflecting current, for example, saw-toothed wave generators 52 and 53 may be arranged to supply current to deflect the electron phalanx which is emitted from the active portions of the cathode in proportion to the illumination thereof. Vision signals may be drawn from the target 47 and will appear as voltage drops across the resistor 57, which voltage drops may be supplied to any suitable amplifier or other apparatus and transmitted to a vision receiver.

In accordance with the invention, it is contemplated that the television camera tube shall scan successive image points of each line of the film images (or electron images thereof), that is to say that the television camera device shall perform the horizontal line scanning operation, while vertical or frame scanning is effected in the main by movement of the film itself in the course of rotation of the sprocket 17. Therefore, the vertical scanning coil 51 and its associated saw-toothed generator 53 may be omitted from the dissector, and the apparatus adjusted in such a way that the electron image formed in the plane of the target 48 is an image of that part of the optical image on the photo-cathode 46 which is in sharp focus; namely, the part which corresponds to a band of the film image which instantaneously intersects the horizontal diameter of the sprocket drum 17. Thus, although the whole of each image on the film 10 may be projected on the photocathode 46, the greater part of the resulting optical image on the photocathode 46 being in poor focus, this has no harmful effect, since the target 47 scans only those parts which are in sharp focus.

In practice, however, it is preferred to retain and utilize the vertical scanning elements of the dissector in order to limit the scanning principally to the image frames themselves and scan the intermediate blank spaces which separate the successive image frames of the film only to the small extent consistent with current television practice. Thus, if picture film of the standard variety is employed in which the spacing bars occupy about 15 per cent of the center-to-center distance between frames, the vertical scanning saw-tooth generator may be adjusted to cause the electron phalanx to "chase" the film image band movement at a speed of, for example, 8 per cent of the film speed over each frame and utilize the remaining 7 per cent for comparatively rapid fly-back at times when the blank spaces between film frames would otherwise be scanned. The signal currents drawn from the dissector target will thus conform to present day television standards in which about 7 per cent of the total scanning time is allotted to vertical "blanking."

A small amount of vertical scanning offers a further important advantage in that it prevents a streakiness in the received image which would result without it. If no vertical sweep were employed, the electrons received by the target 47 would all originate from the same horizontal line of the photocathode 46, and unavoidable minute irregularities of the surface and photosensitivity of the latter would be reproduced in turn in the distribution of electrons in the phalanx, in the vision currents drawn from the target 47 and finally as vertical streaks in the received image. By the preferred small amount of vertical sweep, the portion of the cathode from which the electrons are gathered is continually shifted with the result that the streaks cannot be observed.

In order to transmit from standardized motion picture film bearing images intended for intermittent projection at the rate of twenty-four frames per second and at the same time meet the present television standards of the Radio Manufacturers' Association, namely, transmission of thirty complete images per second, 441 lines interlaced, a special intermediate film may advantageously be employed on which are two successive duplicates of the first original image, three of the second, two of the third, three of the fourth and so on. When this special film is run through the apparatus at the rate of sixty frames per second, the horizontal sweep generator 52 being adjusted to sweep the phalanx over the target 220.5 times during the passage of each frame past the picture gate, the vision signals are practically identical with those that result from the standard television practice of four hundred forty-one lines interlaced scanning of thirty frames per second, and can be correctly reconstituted by a standard television receiver.

The special intermediate film, if its frames are of standard size, is "stretched" as compared with standard twenty-four frames per second film in the ratio of 60 to 24 or 5 to 2. The sound track is, of course, "stretched" in the same ratio.

The apparatus of the invention, however, is by no means limited to use with such special film. For example, standard twenty-four frames per second film may be employed and scanned sequentially. In such case, of course, the signals will not be of standard variety and adjustment or modification will be required in the receiver to enable it to reconstitute them correctly.

As will be understood by those skilled in the art, any suitable apparatus or methods may be employed to hold the transmitter and receiver in synchronism with one another. Since they form no part of the invention, they have in the interests of simplicity been omitted from the drawing.

For translating the sound record which appears on the sound track of the film 10, whether of the special intermediate type or of the standard variety, there is provided a second optical system, comprising a source, optical light deflecting elements, a light gate and a photo-electric cell. The light gate may advantageously be an aperture whose length does not exceed the width of the sound track of the film 10. This gate may be disposed in the upper surface of the shield 16 over which the film is drawn and against which it is maintained in close contact by tension between the main sprocket 17 and the auxiliary sprocket 15.

Referring additionally to Fig. 2 which shows the arrangement of the optical elements and the path of the light beam, the beam from the source 60, which may comprise an elongated filament, is first projected in a downward direction, converged by a lens 61, deflected into a horizontal direction by a prism 62 and again deflected into a vertical direction by a prism 63 onto the sound track 12 of the film 10. The lens 61 is preferably arranged to focus an image of the filament of the lamp 60 on the film within the sound light gate. This sharply illuminated portion of the film is then imaged by the spherical lenses 64 on the masking slit 65, and the light passing therethrough is then diffused by the cylindrical lens 66 to flood the cathode of the photoelectric cell 67, which translates variations of the intensity of the light impinging on it into sound signals which may appear as voltage drops across the resistor 68, whence they may be fed to a suitable amplifier. The aperture of the system as a whole is determined by the width of the slit 65 which, if desired, may be adjustable.

The prism 63, lenses 64 and 66, the slit 65 and the photoelectric cell 67 may be conveniently mounted in the housing 23 or in another housing fixed with respect thereto, while the lamp 60, lens 61 and prism 62 may conveniently be mounted on the reverse side of the housing so that the back of the housing provides a convenient partition to prevent stray light from the source 60 from reaching the photoelectric cell 67. In such case the beam between the prism 62 and the prism 63 passes through an aperture in this partition.

The initial projection of the beam in a vertical instead of a horizontal direction is of advantage inasmuch as with this arrangement any displacement of the filament from its proper position due to sagging under the action of its own heat and gravity is manifested as a displacement of the filament image in the line of the optical axis of the system which merely reduces the sharpness of the focus on the sound light gate, and not as a lateral displacement of the image from the gate.

In order to investigate the behavior for example, the resolution of the television components of the system, it may be desirable on occasion to project a still picture or image on the photoelectric cathode 46 of the dissector or other television camera device. This is simply accomplished with the apparatus of the preferred arrangement shown in Fig. 1 by the provision of means such as a frame into which such a picture may be inserted. To this end the picture gate 43 is provided with slots placed to fit a standard motion picture frame and when such a frame is placed therein it may be projected with light of the source 40 through the elements 41, 42 and 44 onto the photocathode 46, without in any way altering or readjusting the apparatus except to readjust the focus of lenses 41 and 44. For this purpose it is only necessary to rotate the sprocket drum 17 until the light path from the source 40 to the gate 43 is not blocked either by one of the bars 19 or by a film image covering one of the apertures 18.

What is claimed is:

1. The combination with a wheel-like rotatable element, the peripheral portion of which is in part at least light conducting and of width as great as that of a motion picture film, of means for continuously rotating said element, reels and guides for holding and guiding a motion picture film to cause portions of it to successively contact the outer surface of said peripheral portion and to move therewith, means for scanning each frame of said film in transverse elemental strips so that each strip at a particular instant in the course of scanning said strip occupies a position in space which differs from but greatly overlaps the position occupied by a subsequently scanned strip of said frame at a corresponding instant in the course of its scanning, said scanning means including means for directing a beam of light through the peripheral portion of said wheel-like element and stationary means for receiving said beam of light after it has passed through said peripheral portion and through a film frame instantaneously in contact with said peripheral portion, and stationary film-sound-track reading means adjacent said wheel-like element.

2. A sound-film projector for television comprising a uniformly rotating film sprocket, a shield of substantially semicylindrical form disposed with its diametral surface adjacent the circumference of said sprocket, said shield having a slot piercing the portion more remote from said sprocket, a television pick-up device, a photoelectric cell, a film carrying a row of discrete images and a continuous sound track passing over a circumferential arc of said sprocket and over said shield, means for passing a light beam through said circumferential sprocket arc and said film to project said successive film images onto said pick-up device, and means for passing another light beam between said sprocket and said shield, through the slot of said shield and said sound track to said photoelectric cell, the axes of said light beams lying substantially at right angles to each other.

3. A sound-film projector for television comprising a film sprocket, a film passing about a circumferential arc of said sprocket and snugly engaging said arc, means for projecting a beam of light through said circumferential arc to illuminate an area of said film, a picture gate adjacent said circumferential arc, a television pick-up device comprising an image-receiving element, means for sharply focusing a narrow band of said illuminated film, extending transversely of said film, through said light gate onto said image-receiving element, means for scanning an image of said narrow band in a direction transverse to the length of said film, a sound gate adjacent the periphery of said sprocket and angularly displaced from said picture gate, and means for uniformly rotating said film sprocket to advance said film past said picture gate and said light gate.

4. In the art of television, means for scanning a picture film comprising a succession of frames to set up currents representative of the tone values of parallel elemental transverse strips of said film, said means comprising a wheel-like structure the rim of which is provided with a series of like openings of approximately the size and shape of the picture portion of a frame of said film, the centers of said openings all lying in a plane perpendicular to the axis of rotation of said wheel-like structure, rotating driving means for continuously rotating said wheel-like structure, means for maintaining the periphery of each frame of said film, while said frame is being scanned, in close engagement with the outside of said rim with its picture portion in substantial registry with one of said openings, means for directly coupling said driving means to said wheel-like structure, the rotating system comprising said driving means and said wheel-like structure being massive and resiliently coupled to a driving motor to cause said wheel-like structure to rotate with continuous steady movement substantially unaffected by any variable drag thereon by said film, and means cooperating with said wheel-like structure for scanning each of said frames along parallel elemental transverse strips thereof comprising means for transmitting a light beam through said openings and said frames in succession as said wheel-like structure rotates including an optical element inside said wheel-like structure in the path of said beam.

5. In the art of television, means for scanning a picture film comprising a succession of frames and a sound track to simultaneously set up currents representative of the tone values of parallel elemental transverse strip of said film and of the variations of said sound track respectively, said means comprising a wheel-like structure the rim of which is provided with a series of like openings of approximately the size and shape of the picture portion of a frame of said film, driving means for continuously rotating said wheel-like structure, means for maintaining the periphery of each frame of said film, while said frame is being scanned, in close engagement with the outside of said rim with its picture portion in substantial registry with one of said openings, means cooperating with said wheel-like structure for scanning each of said frames along parallel elemental transverse strips thereof comprising means for transmitting a light beam through said openings and said frames in succession as said wheel-like structure rotates including an optical element inside said wheel-like structure in the path of said beam, and means adjacent the outside rim of said wheel-like structure having a curved surface over which means said film passes in contact with said curved surface, the curved surface of said last-mentioned means having an opening in substantial registry with said sound track offering continuous free passage to a beam of light, and means for continuously passing a beam of light through said film and said opening to a light sensitive element for reading said sound track.

6. In apparatus for deriving vision signals from successive discrete frame images borne by a motion picture film and sound signals from a continuous sound track borne by said film, a rotatable film sprocket, a shield adjacent the outer periphery of said sprocket having a curved face pierced by an opening, a television pick-up device disposed adjacent said sprocket on a line substantially at right angles to a line joining said shield to the axis of said sprocket, which pick-up device is arranged to deliver vision signals in response to a moving image projected thereon, a photoelectric cell arranged to deliver sound signals in response to a light beam of varying intensity projected thereon, means for guiding a film bearing a series of discrete image frames and a continuous sound track about a circumferential arc of said sprocket and the curved face of said shield, means for imparting continuous uniform rotation to said sprocket and thus to the portion of said film which is guided about said circumferential arc, means for passing a light beam through said circumferential sprocket arc and said film to project an image of said continuously moving film portion onto said pick-up device, and means for passing another light beam between said sprocket and the curved face of said shield, through said opening and said sound track to said photoelectric cell.

7. In apparatus for deriving vision signals from successive discrete frame images borne by a motion picture film and sound signals from a continuous sound track borne by said film, a mass-controlled rotatable film sprocket, a shield adjacent the outer periphery of said sprocket having a curved face pierced by a slit, a television pick-up device disposed adjacent said sprocket on a line substantially at right angles to a line joining said shield to the axis of said sprocket, which pick-up device is arranged to deliver vision signals in response to a moving image projected thereon, a photoelectric cell arranged to deliver sound signals in response to a light beam of varying intensity projected thereon, means for guiding a film bearing a series of discrete image frames and a continuous sound track about a circumferential arc of said sprocket and the curved face of said shield, means for imparting continuous uniform rotation to said sprocket and thus to a portion of said film which is guided about said circumferential arc, means for passing a light beam through said circumferential sprocket arc and said film to project an image of said continuously moving film portion onto said pick-up device, and means for passing another light beam between said sprocket and the curved face of said shield, through said slit and said sound track to said photoelectric cell.

8. In apparatus for deriving vision signals from successive discrete frame images borne by a motion picture film and sound signals from a continuous sound track borne by said film, a wheel-like rotatable member arranged to be wrapped throughout a substantial part of its circumferential arc by said film, the circumference of said member being light conducting throughout parts thereof which come into registry with film frame images, means for imparting continuous substantially uniform rotation to said member, an image receiving screen, means for projecting a beam of light along a diameter of said wheel-like member through a light-conducting part of the circumference thereof and through a portion of a film frame image instantaneously in registry with said light conducting circumferential part to form on said screen an image of said film frame image portion, means for deriving vision signals from said partial image and from succeeding similar partial images, which signal-deriving means include means for scanning each of said partial images along transverse elemental strips each of which occupies a position which differs from but greatly overlaps the position subsequently scanned.

9. In apparatus for deriving vision signals from successive discrete frame images borne by a motion picture film and sound signals from a continuous sound track borne by said film, a wheel-like rotatable member arranged to be wrapped throughout a substantial part of its circumferential arc by said film, the circumference of said member being light conducting throughout parts thereof which come into registry with film frame images, means for imparting continuous substantially uniform rotation to said member, an image receiving screen, means for projecting a beam of light along a diameter of said wheel-like member through a light-conducting part of the circumference thereof and through a portion of a film frame image instantaneously in registry with said light-conducting circumferential part to form on said screen an image of said film frame image portion, means for deriving vision signals from said partial image and from succeeding similar partial images, which signal-deriving means include means for scanning each of said partial images along transverse elemental strips each of which occupies a position which differs from but, greatly overlaps the position occupied by a strip subsequently scanned, and stationary film sound track reading means adjacent the circumference of said wheel-like member.

10. In apparatus for deriving vision signals from successive discrete frame images borne by a motion picture film and sound signals from a continuous sound track borne by said film, a wheel-like rotatable member arranged to be wrapped throughout a part of its circumferential arc by said film, the circumference of said member being light conducting throughout parts thereof which come into registry with film frame images, means for imparting continuous uniform rotation to said member, a source of light, a television pick-up device including an image receiving screen and means for scanning said screen along transverse elemental lines to derive vision signals varying in dependence on the light-tone values of successive areas of an image formed on said screen, means for projecting a beam of light of said source along a diameter of said wheel-like member, through a light-conducting part of the circumference thereof and through a portion of a film frame image instantaneously in registry with said light-conducting circumferential part to form on said screen an image of said film frame image portion, and means for causing said successive transverse elemental scanning lines to greatly but not entirely overlap each other.

11. In apparatus for deriving vision signals from successive discrete frame images borne by a motion picture film and sound signals from a continuous sound track borne by said film, a wheel-like rotatable member arranged to be wrapped throughout a part of its circumferential arc by said film, the circumference of said member being light conducting throughout parts thereof which come into registry with film image frames, means for imparting continuous uniform rotation to said member, a source of light, a television pick-up device including an image receiving screen and means for scanning said screen along transverse elemental lines to derive vision signals varying in dependence on the light-tone values of successive areas of an image formed on said screen, means for projecting a beam of light of said source along a diameter of said wheel-like member, through a light-conducting part of the circumference thereof and through a portion of a film frame image instantaneously in registry with said light-conducting circumferential part to form on said screen an image of said film frame image portion, and means for causing said successive transverse elemental scanning lines to greatly but not entirely overlap each other, the ratio of scanning line advance to scanning line pitch being equal to or less than the ratio of film frame image separation distance to film frame image pitch.

12. In apparatus for deriving vision signals from successive discrete frame images borne by a motion picture film and sound signals from a continuous sound track borne by said film, a wheel-like rotatable member arranged to be wrapped throughout a substantial part of its circumferential arc by said film, the circumference of said member being light conducting throughout parts thereof which come into registry with film image frames, means for imparting continuous substantially uniform rotation to said member, an image receiving screen, means for projecting a beam of light along a diameter of said wheel-like member through a light-conducting part of the circumference thereof and through a portion of a film frame image instantaneously in registry with said light-conducting circumferential part to form on said screen an image of said film frame image portion, means for deriving vision signals from said partial image and from succeeding similar partial images, which signal-deriving means include means for scanning each of said partial images along transverse elemental lines which occupy positions which differ from but greatly overlap the positions of adjacent lines when scanned, and stationary film sound track reading means adjacent the circumference of said wheel-like member.

CHARLES F. MATTKE.
ROY V. TERRY.